United States Patent [19]

Sedley

[11] 3,999,023

[45] Dec. 21, 1976

[54] MAGNETIC CARD READER

[76] Inventor: Bruce S. Sedley, 7 Murray Ave., Larkspur, Calif. 94939

[22] Filed: Mar. 10, 1975

[21] Appl. No.: 556,655

[52] U.S. Cl. .................. 200/46; 235/61.11 D; 235/61.12 M
[51] Int. Cl.² ..................................... H01H 43/08
[58] Field of Search ............ 340/149 R, 174 QB; 235/61.11 D, 61.12 M; 200/46

[56] References Cited

UNITED STATES PATENTS

| | | | |
|---|---|---|---|
| 3,581,030 | 5/1971 | Sedley | 235/61.11 D |
| 3,788,617 | 1/1974 | Barney | 235/61.11 D |

Primary Examiner—Herman Hohauser
Attorney, Agent, or Firm—Gordon Wood

[57] ABSTRACT

A magnetic card reader for providing an output to a utilization device. A plurality of reed switches are arranged in coplanar relationship and means is provided for maximizing the flux of magnetized spots of a magnetically coded card so that a predetermined magnetized spot actuates a predetermined reed switch of the reader without requiring any internal magnetic biasing. The flux of the magnetized spots is maximized by providing relatively large contiguous areas of a polarity reversed from that of the magnetized spot which actuates a switch.

6 Claims, 8 Drawing Figures

U.S. Patent  Dec. 21, 1976  3,999,023
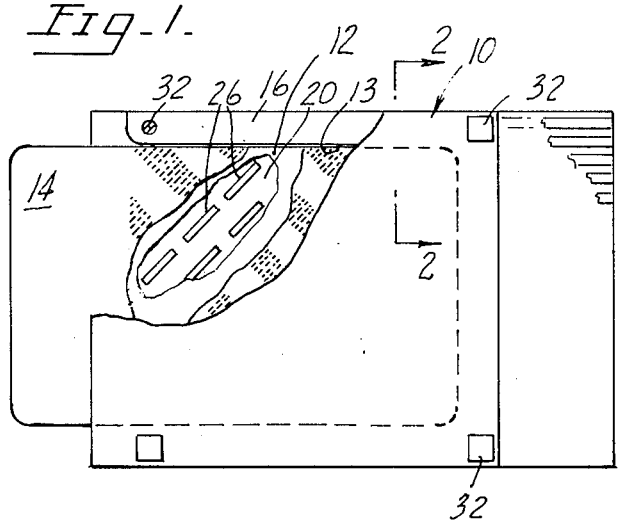
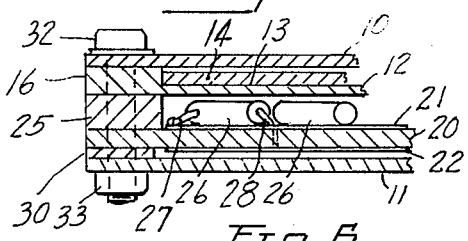
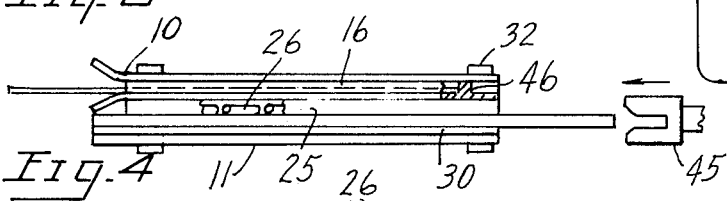
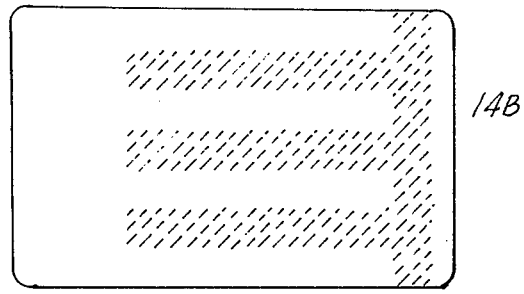
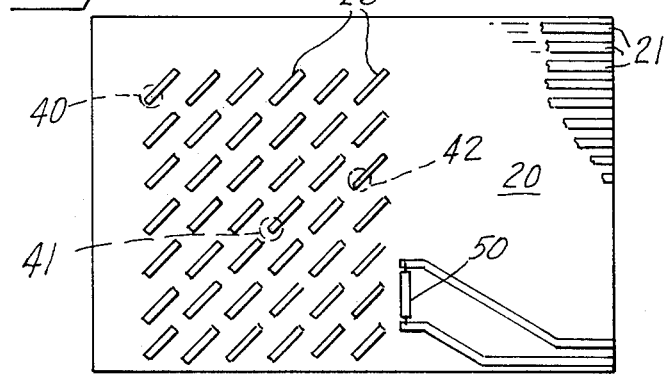
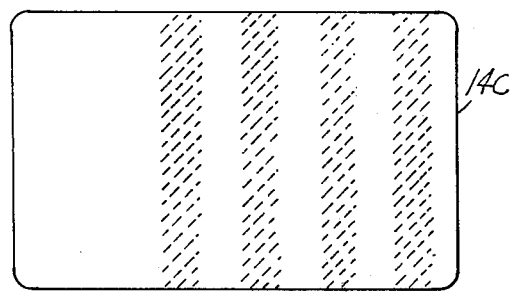
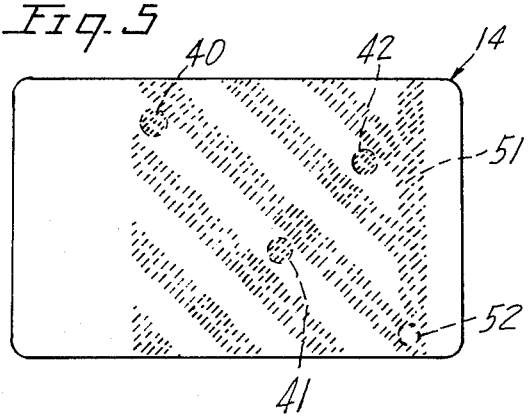
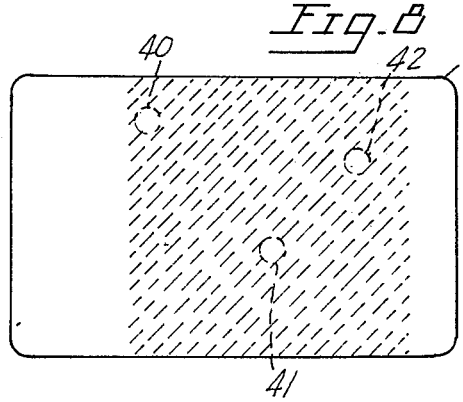

MAGNETIC CARD READER

This invention relates to a reader for reading the combination or code of a magnetic card having magnetized spots at predetermined points thereon. The invention will be described in connection with a reader having its output connected to a card code indicating device. However, it will be apparent that the invention is usable in other connections as a switch means for closing predetermined circuits in a utilization device associated with the particular magnetic card employed.

Heretofore, readers have been provided employing switches which are actuatable by predetermined magnetized spots or shims in a magnetically coded card. Examples of such readers are shown in my U.S. Pat. No. 3,581,030 and Ryno U.S. Pat. No. 3,274,352. In the structures of these patents the reed switches adapted to be actuated by the magnetized spots or shims in the card are in some way internally biased by magnets inside the card reader mechanism. Such magnets tend either to bring the switch reeds toward a closed condition or the magnets actually close the switch reeds so that the magnet inserted between the biasing magnets and the reed switch cause the switch to open.

A serious problem with card readers of the above described type is that some time is required to properly calibrate the readers and the required magnetic biasing for each of the individual reed switches since, due to the nature of their manufacture, they do not all pull in or drop out at the same magnetic field strength. This requirement to calibrate the readers introduces additional labor costs, but more importantly, the potential exists for the readers going out of calibration once they are put in service, and as the calibration requires special tools and training, it is not too feasible to have this work done while the reader is in operation in the field. Due to the complexity of the construction of the presently available card readers of the type operated by reed switches, the cost is quite high and relegates them to use in industrial markets wherein these charges can be accepted.

The main object of the present invention is the provision of a magnetic operated card reader which requires no calibration and which requires no internal biasing of the magnetic sensors.

Another object of the invention is the provision of a magnetic card operated reader which is inexpensive to construct.

The objects of the present invention are achieved in part by the provision of a novel card key in which the magnetic spots are made in such a manner as to maximize the strength of the flux of such spots, thereby permitting actuation of associated reed switches without employing internal biasing and without incurring the associated expense thereof.

It has been discovered that a magnetic spot of increased flux strength may be achieved by magnetizing the area adjoining the spot with a particular polarity and magnetizing the spot within such area with a reverse polarity. In addition, it has also been found that the flux strength of a magnetized spot may be further enhanced by providing the card with predetermined areas or stripes of predetermined polarity with the polarity of adjacent areas or stripes reversed and with the magnetized spots in any particular area reversed from the polarity of the area itself.

Other objects and advantages of the invention will be apparent from the following specification and from the drawings.

FIG. 1 is a top plan view partially broken away of a preferred form of the invention with a magnetic card key inserted therein.

FIG. 2 is a greatly enlarged fragmentary sectional view through the reader as taken in a plane indicated by lines 2—2 of FIG. 1.

FIG. 3 is a side elevation partly in section of the reader of FIG. 1.

FIG. 4 is a top plan view of the printed circit board and the read switches arranged thereon.

FIG. 5 is a top plan view of one form of card key usable with the arrangement of FIG. 4 and indicating schematically by dotted lines the areas of the card of north polarity.

FIGS. 6–8 are views similar to FIG. 5 showing other forms of magnetized cards.

In detail, and first with reference to FIGS. 1–3, the invention comprises an upper plate generally designated 10 of magnetizable material, such as steel, and a lower plate 11 also of magnetizable material. Under the upper plate 10 is a plate 12 of nonmagnetic material such as aluminum (see FIG. 2). The thickness of plate 11 is reduced along its central portion so that a relatively wide slot 13 is provided into which a magnetic card 14 may be inserted from the left hand end of the reader as shown in FIG. 1. By this structure the enlarged marginal portions 16 of plate 12 provide space to allow adequate clearance for the card 14.

Spaced downwardly from the plate 12 is a printed circuit board 20 formed with upper and lower printed circuits 21, 22 (FIG. 2). This board is spaced downwardly from plate 12 by means of longitudinally extending spacers 25 so as to provide sufficient space between plate 12 and printed circuit board 20 to accommodate an arrangement of reed switches 26. One arrangement of such reed switches is shown in FIG. 4. Referring to FIG. 2, each reed switch 26 is connected by connectors 27 to upper printed circuits 21 and the opposite end of each reed switch is connected by a connector 28 to the printed circuit 22.

Spaced downwardly from board 20 by means of longitudinally extending spacers 30 is the lower steel plate 11. The above described assembly is connected together by means of screws 32 and nuts 33. The elements of the above described assembly are provided with suitable openings for the shanks of bolts 32 to be received therethrough as shown in FIG. 2.

Referring to FIG. 4, it will be seen that the reed switches 26 are arranged in a regular spaced apart relationship with each switch extending at an angle of about 45° relative to the longitudinal extent of board 20. This permits very close spacing of the corresponding ends of the switches so that said corresponding ends may be positioned in registration with predetermined magnetizable points on the magnetic card 14. Thus as seen in FIG. 4, the corresponding ends of certain reed switches 26 are in registration with magnetized spots indicated at 40, 41 and 42 by dotted circles. Said same spots are indicated on the magnetic card of FIG. 5.

All of the reed switches 26 are connected on the upper side of board 20 to printed circuits indicated at 21 in FIG. 4. Such printed circuits are well known in the art and complete circuits from the switches to the edge of board 4 are not indicated in detail. It will be understood that an edge connector indicated schematically in FIG. 3 at 45 may be secured to the edge of board 20 to connect the various circuits to a utilization device (not shown).

Proper registration of the magnetic card 14 with the switches 26 is achieved by providing a stop 46 on plate 12 as indicated in FIG. 3 and which stop is adapted to be abutted by the leading edge of the card 14 when the latter is properly positioned.

As noted above, one of the reasons why the object of the present invention can be achieved without providing internal magnetic biasing in the reader is that the card of the present invention is formulated so as to greatly increase the intensity of the flux from the magnetized spots which define the combination of the magnetic key. One method of achieving this increased intensity is to magnetize the area of the magnetizable points with a reversed polarity to that of the magnetized spots at said point. One method of doing this is illustrated in FIG. 8 wherein the shaded portion is magnetized in a direction perpendicular to the faces of the card 14A so that, for example, the upper face has a north polarity and the opposite face has a south polarity. If it is desired to encode the card at the spots 40, 41 and 42, a strong flux is passed through the desired magnetizable points by use of relatively small electrodes about equal to the diameter of the spots desired. Thus, in FIG. 8, spots 40, 41 and 42 would be magnetized so that the south poles are on the upper face and the north poles on the lower face. By employing the card 14A with the arrangement of reed switches 26 shown in FIG. 4, the flux at points 40, 41 and 42 can be made strong enough in combination with the contiguous areas of opposite polarity to actuate the corresponding reed switches in the desired manner without internal biasing.

An even more intensified flux may be achieved by the formulation of FIG. 5 wherein the card 14 is provided with diagonally extending stripes of alternating polarity on the upper side of the card and with the opposite polarity on the lower side of the card.

In this arrangement all of the reed switches, except those corresponding to magnetized spots, "see" opposite polarities at their opposite ends and are thus closed by a properly positioned card. The reed switches corresponding to spots 40, 41 and 42 are placed with the one reed end of each switch underlying these three spots of adjacent north polarity. The opposite ends of said three switches are also underlying an area of north polarity causing the corresponding switches to open.

The magnetized stripes on the card need not necessarily extend diagonally and in FIGS. 6, 7, the cards 14B, 14C are shown with the stripes extending in directions parallel to the side edges of the card. In these last mentioned arrangements it will be apparent that the reed switches may also be arranged in a direction slantingly disposed to the side edges of the card to achieve the desired economy of space, and perpendicular relationship between large areas of opposite polarity.

The present invention also contemplates the provision of means for insuring that the card is placed in the reader with the proper side up. This may be achieved by means of a reed switch 50 adjacent the leading edge of card 14 which is adapted to register with a transversely extending stripe 51 on card 14 of predetermined polarity. Adjacent one of the longitudinally extending edges of the card 14 a spot 52 of opposite polarity is provided in registration with one end of the reed switch 50. In this case the reed switch 50 "sees" opposite polarities at its ends and thus closes when the card is properly positioned. If the card is inserted with the wrong side up, the switch 50 will "see" similar polarities and will remain open. The closing of switch 50 may be used to close an enabling circuit which in turn energizes the circuits 21.

As noted above, the arrangements of FIGS. 5–7 are preferable to that of FIG. 8 since it has been found that a more intense flux can be achieved by the use of the above described magnetic stripes. In the arrangement of FIG. 5, for example, it will be understood that most of the reed switches 26 are exposed to different polarities at their opposite ends and therefore tend to close while the reed switches corresponding to spots 40, 41, 42 tend to open when the card is properly positioned. This lends itself to a reverse or complementary encoding format from the standard binary coded decimal system. For example, in the conventional BCD system, the numeral 1 would be the equivalent of spots at 2, 4, 8. Numeral 2 would equal spots at 1, 4, 8 and so on.

It should also be noted from FIGS. 4, 5 that the boundaries on the card between areas of different polarity are perpendicular to the longitudinal extent of the reed switches. This also enhances the strength of the flux of switches 26.

In addition, the presence of upper and lower steel plates 10, 11 improves the strength of the magnetic card flux since they shield the card from outside magnetic influence. Furthermore, the upper steel plate 10 being closely adjacent the card 14 provides a low reluctance path for the lines of force of the flux thereby intensifying the latter, including the lines of force on the opposite side of the card.

It is emphasized that the steps taken to intensify the flux of the magnetic card are very important since the thickness of the card is preferably not substantially thicker than a conventional credit card thus making it more difficult to establish strong polarities than would be the case if the card were much thicker.

I claim:
1. A magnetic card reader having no internal biasing for reading a magnetized data card adapted to be placed in a predetermined position in said reader, said card having magnetizable points arranged in a predetermined arrangement to permit coding said card by magnetizing certain spots at certain of said points, said reader comprising:
   a base having a flat side,
   a plurality of elongated reed switches supported on said side with the longitudinal central axes of said switches lying in a common plane parallel to said flat side in coplanar relationship and parallel to said side,
   means for positioning said card parallel to the common plane of said reed switches with the magnetizable points of said card in registration with and closely adjacent corresponding ends of said switches whereby the flux of the magnetized spots actuates the switches corresponding to such magnetized spots.

2. A card reader according to claim 1 wherein one reed switch is positioned on said base in a position corresponding to a magnetized spot on said card when the latter is properly positioned, a circuit including said one switch for enabling the circuits of said plurality of reed switches.

3. A magnetically encoded card and a reader therefor having no internal biasing, comprising:
   a base having a flat side, a plurality of elongated reed switches supported on said side at predetermined points with the longitudinal central axes of said switches lying in a common plane parallel to said flat side, said card having magnetizable points arranged in a corresponding predetermined manner to permit coding said card by magnetizing certain spots at certain of said points, means for positioning said card parallel to the common plane of said reed switches with the magnetizable points of said card in registration with and closely adjacent corresponding ends of said switches whereby the flux of the magnetized spots actuates the switches corresponding thereto.

4. The structure of claim 3 wherein said card is provided with a plurality of parallel magnetized stripes with adjacent stripes magnetized with reversed polarities.

5. The structure of claim 4 wherein said switches are arranged with their longitudinal axes perpendicular to the direction of said stripes.

6. The structure of claim 4 wherein said switches are arranged with their central portions in registration with the boundary line between a pair of adjacent stripes.

* * * * *